US005572677A

United States Patent [19]

Luther et al.

[11] Patent Number: 5,572,677
[45] Date of Patent: Nov. 5, 1996

[54] METHOD AND APPARATUS FOR CONVERSING OVER A NETWORK

[75] Inventors: Willis J. Luther, Irvine; James A. Fontana, Mission Viejo, both of Calif.

[73] Assignee: Canon Information Systems, Inc., Costa Mesa, Calif.

[21] Appl. No.: 285,521

[22] Filed: Aug. 4, 1994

[51] Int. Cl.$^6$ ........................................ G06F 13/00
[52] U.S. Cl. ................ 395/200.04; 395/200.12; 395/200.02; 395/200.08; 364/514
[58] Field of Search ............... 395/200, 200.01–200.09, 395/200.1, 200.11–200.19, 200.2, 200.21, 600, 650; 379/88, 53; 364/514; 370/62

[56] References Cited

U.S. PATENT DOCUMENTS

| | | | |
|---|---|---|---|
| 2,966,552 | 12/1960 | Campbell et al. | 179/6 |
| 3,508,007 | 4/1970 | Goodall et al. | 179/15 |
| 3,883,697 | 5/1975 | Brown | 179/18 |
| 3,925,617 | 12/1975 | Sato | 179/6 R |
| 4,345,114 | 8/1982 | Sato et al. | 179/6.16 |
| 4,566,096 | 1/1986 | Sarson et al. | 370/62 |
| 4,713,835 | 12/1987 | Bond et al. | 379/79 |
| 4,891,835 | 1/1990 | Leung et al. | 379/88 |
| 5,003,574 | 3/1991 | Denq et al. | 379/75 |
| 5,012,509 | 4/1991 | Nakamura et al. | 379/53 |
| 5,113,430 | 5/1992 | Richardson, Jr. et al. | 379/88 |
| 5,125,023 | 6/1992 | Morduch et al. | 379/88 |
| 5,195,086 | 3/1993 | Baumgartner et al. | 370/62 |
| 5,283,856 | 2/1994 | Gross et al. | 395/51 |
| 5,313,638 | 5/1994 | Ogle et al. | 11/725 |
| 5,333,266 | 7/1994 | Boaz et al. | 395/200 |
| 5,381,466 | 1/1995 | Shibayama et al. | 379/88 |
| 5,392,223 | 2/1995 | Caci | 364/514 |
| 5,408,333 | 4/1995 | Kojima et al. | 358/400 |
| 5,428,783 | 6/1995 | Lake | 395/650 |
| 5,434,797 | 7/1995 | Barris | 364/514 A |
| 5,452,341 | 9/1995 | Sattar | 379/88 |
| 5,454,102 | 9/1995 | Tang et al. | 395/600 |
| 5,500,919 | 3/1996 | Luther | 395/2.69 |
| 5,508,732 | 4/1996 | Bottomley et al. | 348/7 |
| 5,515,423 | 5/1996 | Beck et al. | |

FOREIGN PATENT DOCUMENTS 62-269548 11/1987 Japan.

OTHER PUBLICATIONS

G. Krönert, et al., "Cost–Saving Realization of Voice Storage Servers", Siemens Research and Development Reports, vol. 12, No. 1, 1983, pp. 70–75.

D. Coleman, "Meridian Mail Voice Mail System Integrates Voice Processing and Personal Computing", Speech Technology, vol. 4, No. 2, Mar./Apr. 1988, pp. 84–87.

G. Poulain, et al., "An Approach To Multimedia Messaging On ISDNs And LANs", International Switching Symposium, Oct. 1992, vol. 2 pp. 273–277.

Primary Examiner—Christopher B. Shin
Attorney, Agent, or Firm—Fitzpatrick, Cella, Harper & Scinto

[57] ABSTRACT

A network sound channel which permits voice communication over a local area network (LAN). Plural workstations are connected via respective connection nodes to the LAN. Each workstation includes a sound processor for converting sound into digital information and digital information into sound, and each workstation is operable in (a) a talk mode in which the sound processor converts sound into digital information and the digital information is stored in the storage over the LAN, and (b) a listen mode in which digital information is retrieved from the storage over the LAN and the sound processor converts the digital information into sound.

21 Claims, 10 Drawing Sheets

METHOD AND APPARATUS FOR CONVERSING OVER A NETWORK

BACKGROUND OF THE INVENTION

1. Field of The Invention

The present invention relates to a system for voice communication between workstations on a Local Area Network (LAN). More particularly, the present invention relates to a system for sending and receiving voice messages between workstations on a LAN that is completely independent of the network software in use.

2. Description Of The Related Art

LAN's are known for coupling together a plurality of workstations so that information can be readily transferred between workstations and resources can be shared. Heretofore, communication between workstations has been largely limited to messages which are typed on a keyboard at a particular workstation and transmitted to one or more of the other workstations that are logged into a file server. This type of communication between workstations has several limitations. The speed at which a message can be transferred from one workstation to another workstation is limited by both the speed and accuracy at which the user of the workstation sending the message can type. In addition, the number of characters which can be transferred for each message transmission is limited depending on the network software being used. For example, Novell NetWare® LAN software allows messages to be sent to users or groups of users via a "SEND" command. However, the length of each message is limited to 45 characters, minus the number of letters in the user name. Another limitation in standard network communication is that multiple incoming messages to a particular workstation are generally "stacked up" in the order in which they are received. After each message is displayed, read and cleared by the user, the next received message is displayed to be read. Accordingly, although a lengthy message may be sent using consecutive SEND commands, another user may send an intervening message effectively breaking up the lengthy message. Such communication is therefore not practical for communicating messages with great speed or for communicating particularly lengthy messages.

Recently, attempts have been made at broadcasting sound (e.g. audio messages) over a LAN. However, such attempts have required extensive network software modifications.

SUMMARY OF THE INVENTION

The present invention addresses the drawbacks noted above by providing a system that allows audio communication such as voice communication between users of a network by using the network's file server and conventional sound recording and playback equipment.

According to the present invention, sound is digitized at a network workstation, transferred over the LAN and stored as a sound file by a file server on a storage medium. Other workstations on the network access the stored sound file, retrieve it and convert it into an analog signal for playout as sound. Thus, according to one aspect of the present invention, a network sound channel comprises a LAN having a plurality of connection nodes for connecting plural workstations and a storage medium for storing digital information transmitted over the LAN. Each workstation includes a sound processor for converting sound into digital information and digital information into sound. Each workstation is programmed so as to be operable in a talk mode in which the sound processor converts sound into digital information and the digital information is stored in the storage medium over the LAN. Each workstation is also programmed so as to be operable in a listen mode in which the digital information is retrieved from the storage medium over the LAN and the sound processor converts the digital information into sound.

In a preferred embodiment of the invention, the LAN is a NetWare® software package, the sound processor is a Microsoft Sound System® or Sound Blaster Pro® and the personal computers or workstations are IBM PC's or PC compatibles.

BRIEF DESCRIPTION OF THE DRAWINGS

The above-noted advantages and features of the present invention will become more readily apparent from the following detailed description of the preferred embodiments when taken in conjunction with the drawings in which.

DETAILED DESCRIPTION OF THE PREFERRED EMBODIMENTS

Figure 1:
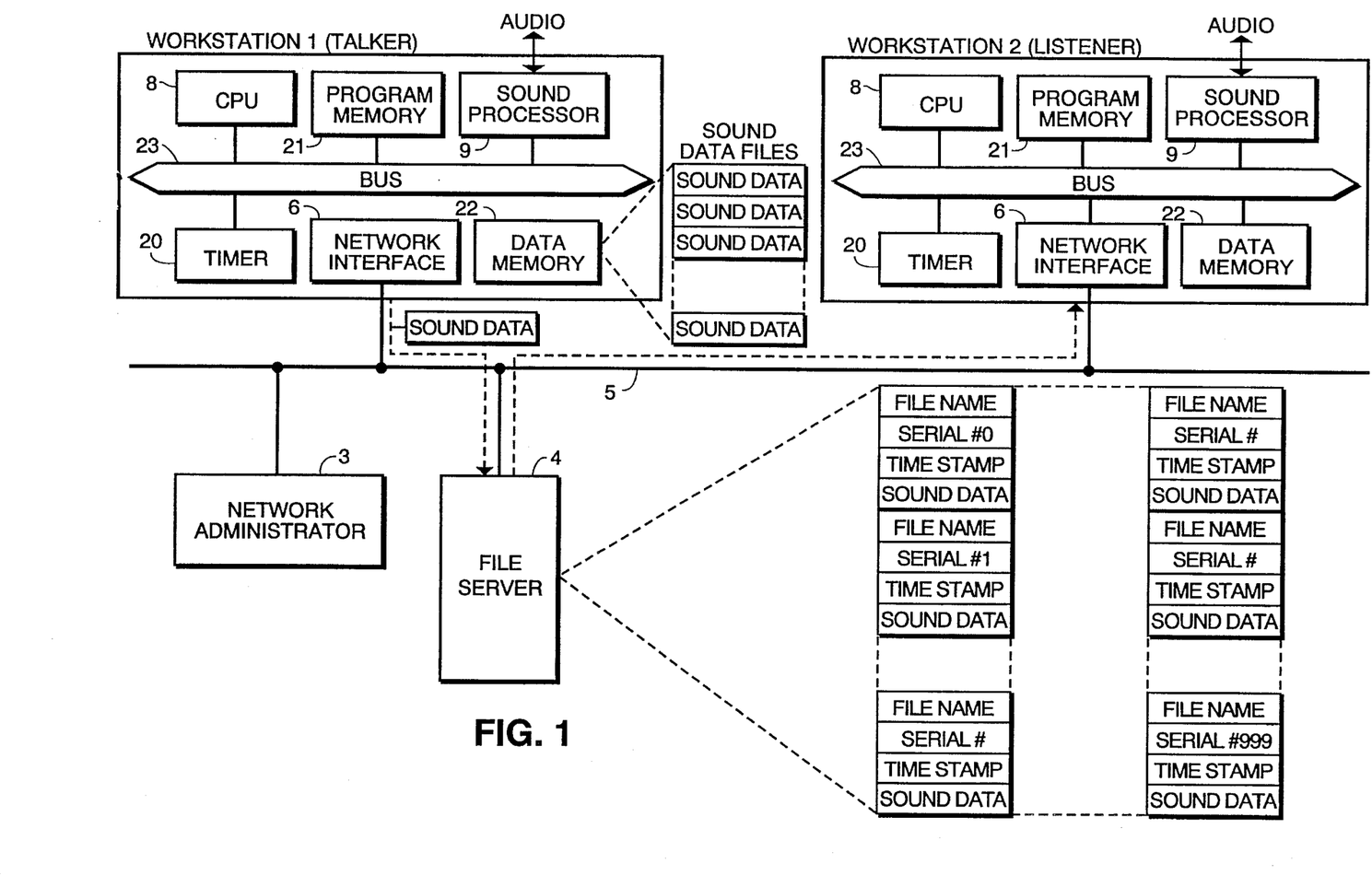
FIG. 1 is a block diagram of a Local Area Network according to a first embodiment of the present invention.

FIG. 1 is a block diagram showing a Local Area Network (LAN) according to a first embodiment of the present invention. Workstation 1, workstation 2, network administrator 3 and file server 4 are interactively connected to LAN 5. Workstation 1 and workstation 2 are coupled to LAN 5 through LAN interface 6. Network administrator 3 is also coupled to LAN bus 5 through a LAN interface (not shown). Although only two workstations are shown in FIG. 1, any number of workstations can be on the network, and in addition workstations may be operably connected on a wide area network (WAN).

Figure 2:
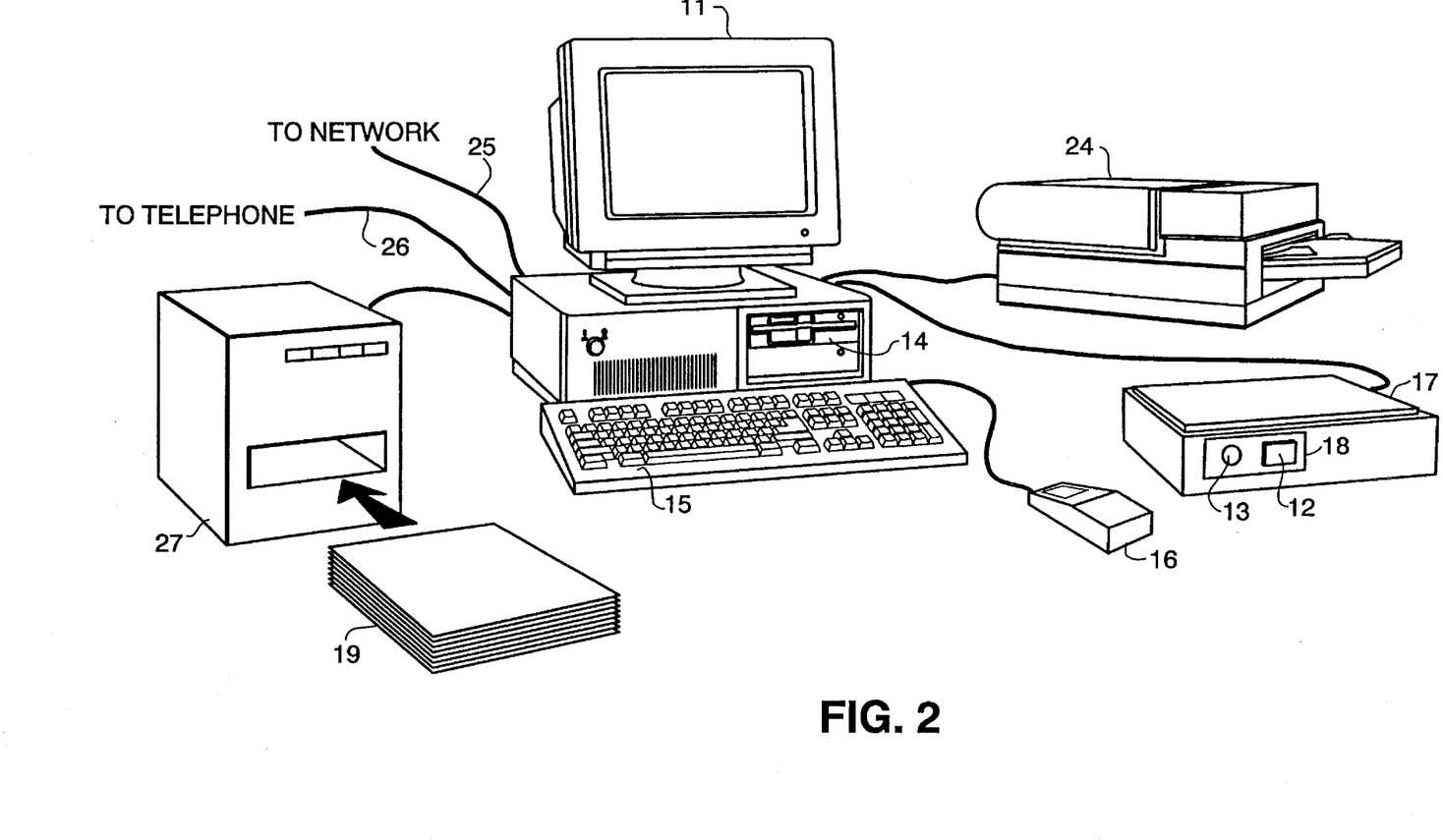
FIG. 2 is a perspective view of the external appearance of a workstation according to the invention.

Workstation 1, workstation 2 and network administrator 3 each comprise computing equipment such as an IBM-PC or PC-compatible computer. An example of such computing equipment is shown in FIG. 2 and includes peripherals such as a mass storage device including a disk device 14 for storing data and application program files. The application program files may contain program instruction sequences by which the computing equipment manipulates data files and presents data in those files to a computer operator via display screen 11. For example, the application programs stored on disk drive 14 include an application program for transmitting and receiving data to and from sound system 17, and a program for transmitting and receiving data to and from a LAN over line 25. Keyboard 15 permits input of text data and allows operator selection and manipulation of data displayed on display screen 11. Pointing device 16, such as a mouse, may be provided to permit fast and easy manipulation and selection of objects on the display screen 11. The computing equipment may also include an optical disk drive 27 for storing information on optical disk 19. The information may be retrieved from disk drive 14 or optical disk 19 for subsequent processing by the computing equipment. An internal or external modem may be provided for communicating information over line 26.

As shown in FIG. 1, each workstation includes at least a CPU 8, a sound processor 9 such as a Microsoft Sound System®, or Sound Blaster Pro® a timer 20, a program memory 21 for storing application programs and a data memory 22 for storing data. These elements are connected via a bus system 23. The bus system 23 can include, for example, a control bus, an address bus and a data bus (not shown). The other peripherals shown in FIG. 2. (i.e., the optical disk, modem, scanner, etc.) are also interfaced to the bus system 23 via respective interfaces (also not shown). Program memory 21 includes Read-Only Memory (ROM) for providing CPU 8 with specialized and invariant functions such as boot-up programs and built-in-operating system (BIOS) programs, as well as Random Access Memory (RAM) in which application programs can be stored. Data memory 22 includes RAM that provides CPU 8 with storage for data generated by application programs, as required. Normally, CPU 8 downloads an application program from disk 14 from an external storage media into the RAM in program memory 21. The program is then executed out of RAM.

Sound processor 9 is controlled by CPU 8. Sound processor 9 includes a speaker for converting an analog audio signal into audio to be listened to by a user and a microphone for converting audio from a user into an analog signal. In a talk mode (discussed in more detail below), an analog audio signal received from the microphone is processed and digitized to generate digitized sound data. The digitized sound data is then stored in data memory 22 as sound data files. The sound data files are transferred to file server 4 and stored in file server 4 along with a file name, serial number and time stamp. In a listen mode (also discussed in more detail below) the digital sound data is retrieved from file server 4 and stored in data memory 22 and is converted into an analog signal which is then output through the speaker in sound processor 9 as audio. Sound processor 9 is controlled by CPU 8 through use of a control bus. Sound processor 9 transmits and receives data to and from data memory 22 over a memory bus comprising an address and data bus. Since in both talk and listen modes all files are transferred using normal network file protocol, no modification of the network operating system is needed.

The network in the present invention may utilize any network software such as Novell or Unix software that allows the transfer of information between various network members. The present embodiments will be described with respect to a LAN utilizing Novell NetWare® software, although any network software may be used. A detailed description of the Novell NetWare® software package may be found in the publications "NetWare® User's Guide" and the "NetWare® Supervisor's Guide" by M&T Books, copyrighted 1990, incorporated herein by reference. Briefly, the file server 4 acts as a file manager for receiving, storing, queuing, caching ad otherwise transmitting data files between LAN members (i.e., workstations). For example, as shown in FIG. 1, data files created at workstation 1 may be routed to file server 4 which may order those data files and then transfer the ordered data files to a printer or to another workstation. In addition, the data files transferred from workstation 1, for example, may be simply stored by the file server to be retrieved at another time by one of the other workstations. The file server 30 may include or may be coupled to a large capacity storage member such as a 10 Gigabyte hard disk subsystem.

According to an embodiment of the present invention, workstations 1 and 2 include a recording control program for operating in a "Talk Mode" and a playback control program for operating in a "Listen Mode." These programs, which can be stored in RAM or ROM in program memory 21 provide voice communication between workstations connected to the LAN. The control programs utilize a CB-radio-like metaphor for communicating (i.e., there can only be one talker at any time on the network and all other users (workstations) in the conversation group may only be listeners on the network.)

Figure 3:
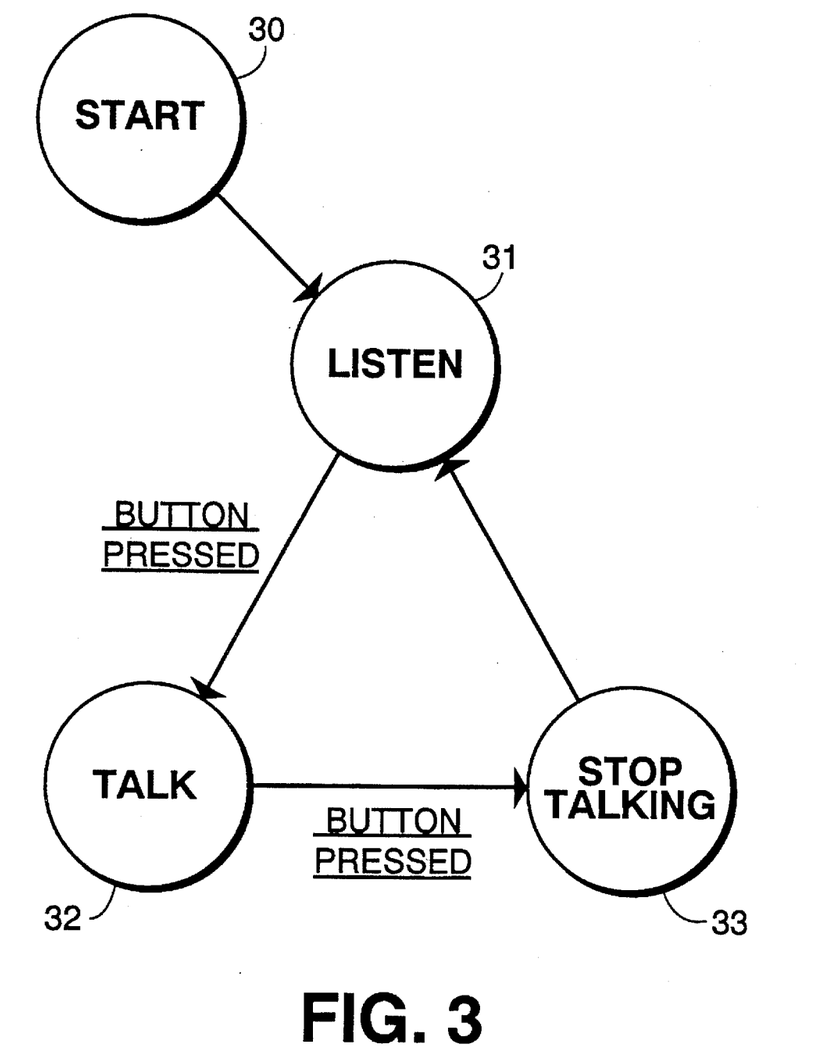
FIG. 3 is a state diagram of the operation of the present invention.
Figure 4A:
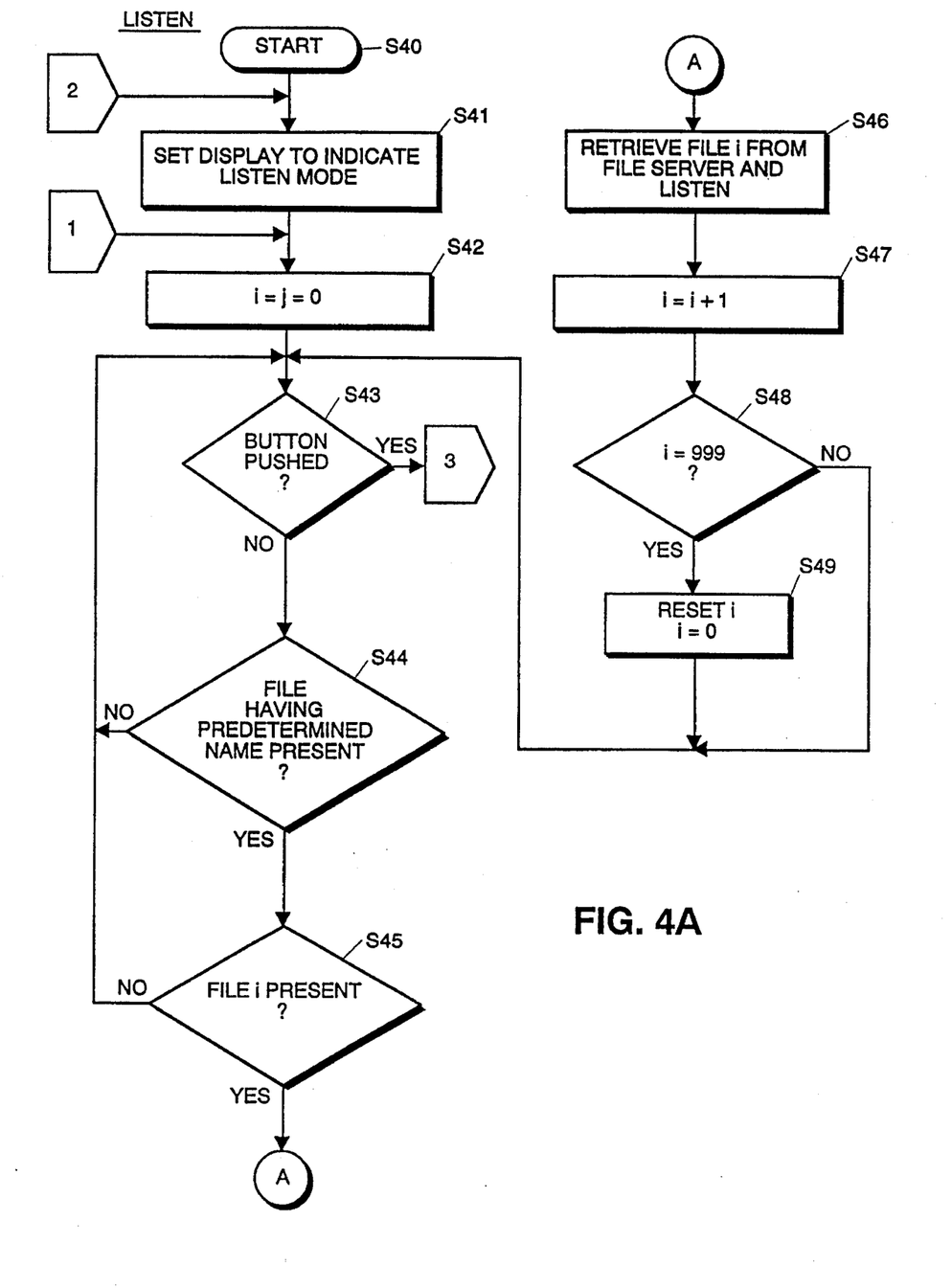
FIGS. 4A and 4B are flow charts depicting the program flow of the listen mode and talk modes, respectively.
Figure 4B:
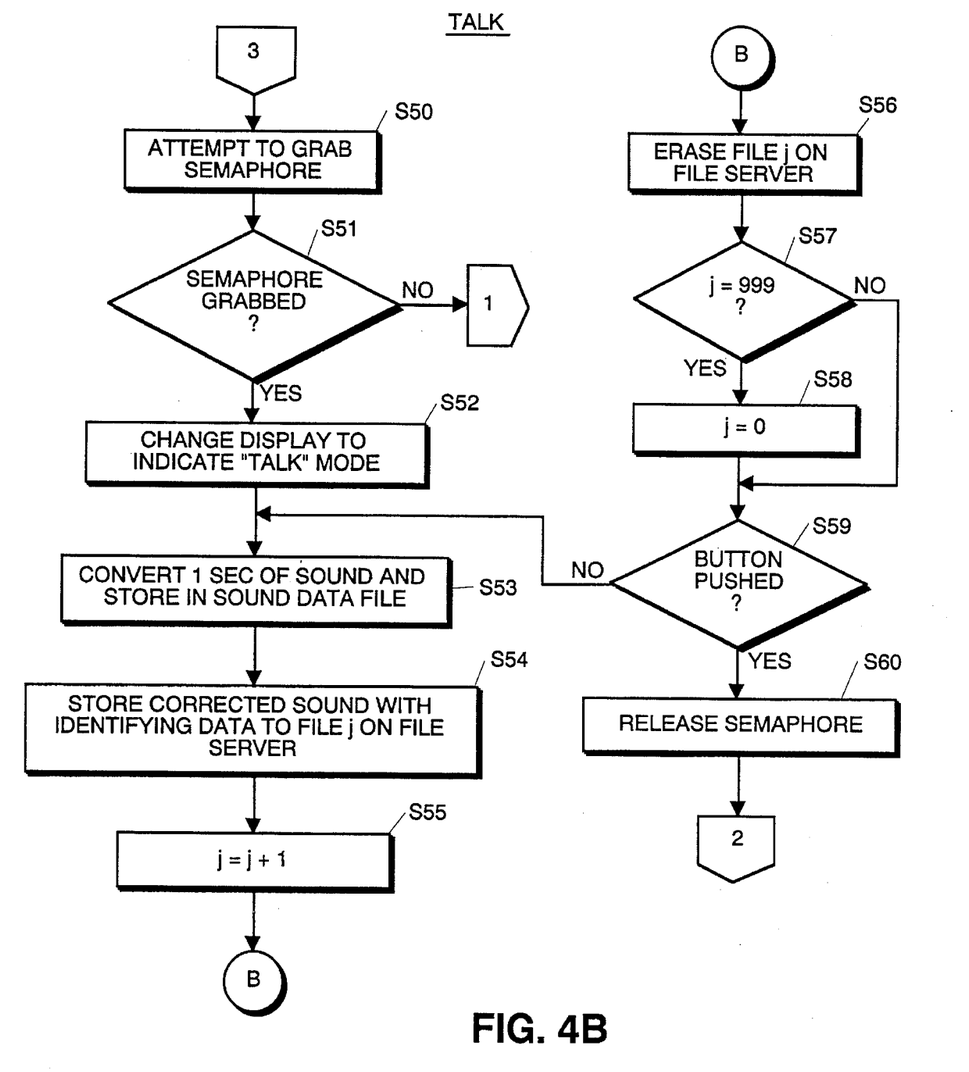

FIG. 3 shows a state diagram of the communication protocol in the network sound channel according to the present invention. After a start command 30 is given in a particular workstation, the workstation enters listen state 31 (listen mode). In listen state 31 a determination is made as to whether any sound data files exist in the file server by attempting to retrieve a sound data file having a predetermined file name from the file server. If such sound data files exist, each workstation in the conversation group can retrieve and listen to them. (The flow chart in FIG. 4A depicts the software flow in the listen state and will be discussed in more detail below.) When button 12 on the user interface 18 (depicted in FIG. 2) to the sound processor 9 is pressed when the system is in the listen state, the system attempts to enter talk state 32 (talk mode) by attempting to grab a network semaphore (sometimes called a "stick") from the file server. In general, a semaphore is used to limit how may tasks can use or change a resource at the same time. In this case, the semaphore is used to enable a workstation to "talk" and to let other workstations attempting to talk know that there is already a talking workstation. If the workstation is successful in grabbing the semaphore, a display 13 to the user, which in this embodiment is also on user interface 18 but can be on display 11, is set to indicate that the workstation is in the talk mode. When the workstation enters the talk mode, audio is converted into digital sound data by sound processor 9 and stored as sound data files in data memory 22. The sound data files are then transferred to the file server along with identifying information. The identifying information comprises a file name, serial number and a time stamp depicted in FIG. 1 and will be described in more detail below. The sound is converted to digital data and transferred to file server 4 until button 12 on the user interface is again pressed. (The flow chart in FIG. 4B depicts the system flow in the "Talk" mode and will be described in more detail below.) When button 12 on the user interface is pressed when the workstation is in the talk state 32, the workstation enters stop talking state 33 in which any remaining sound data files not already transferred are transferred to the file server, the semaphore is released, display 13 is set to indicate that the workstation is in the listen mode and the workstation returns to listen state 31. The workstation is then available to listen to any sound data files on the file server.

FIG. 4A depicts the software flow in the listen state. As shown in FIG. 4A, the program begins by executing a start procedure S40 which initializes and sets different variables and sections of the workstation. In step S41, a display is set to indicate that the system is in the listen mode. In step S42, variables i and j are set to zero. Variable j is used in the talk mode to represent the file space in file server 4 in which the sound data file is to be written to. Variable i is used in the listen mode to indicate the file space in file server 4 containing the next sound data file to be read from file server 4 and listened to. In step S43 a determination is made as to whether button 12 on user interface 18 has been pressed. If button 12 has been pressed, the workstation enters the talk mode. If button 12 has not been pressed, the system determines in step S44 whether a file having a predetermined file name is present in the file server. If present, step S45 determines if a file i exists on the file server 4 to be listened to by attempting to retrieve file i. If file i does not exist, meaning that there is currently no information to be listened to, the program flow returns to step S43. If file i exists on the file server, the file is retrieved from the file server in step S46 and is listened to. In step S47 variable i is incremented by 1. In step S48, a determination is made as to whether i=999. The number 999 is a number selected depending on the amount of file space set aside on file server 4 for speech communication. In other words, the present invention operates using a circular file system, meaning that after a file is read from the 999th file location, the variable i is reset in step S49 to 0 and the system then begins again reading files from file location 0. If variable i does not equal 999, the system returns to step S43 and the procedure repeats. When a determination is made in step S43 that button 12 has been pushed, the workstation attempts to enter the talk mode by attempting to grab the semaphore. As discussed above, the semaphore provides a method of allowing only one workstation on the network to operate in the talk mode at a time. That is, only the workstation that successfully grabs the semaphore can operate in the talk mode.

As shown in FIG. 4B, after an attempt to grab the semaphore has been made in step S50, a determination is made in step S51 as to whether the semaphore was successfully grabbed. If the semaphore is not grabbed successfully, the system returns to the listen mode. If the semaphore is grabbed successfully, display 13 on user interface 18 is set in step S52 to indicate that the workstation is in the talk mode. In step S53, 1 second intervals of sound are converted by sound processor 9 into digital information and stored in a sound data file in data memory 22. In step S54, the sound data file is transferred and stored in file location j on the file server along with various other portions of information identifying the sound data file. The identifying information is described in more detail below. In step S55, variable j is incremented by one. In step S56, the file stored in location j on the file server is erased from the file server. By erasing the following file from the file server, any listening workstations are able to determine if the end of the present conversation has occurred. In step S57, a determination is made as to whether j=999. If yes, the variable j is set to zero in step S58. Again, this provides a circular file space, thus minimizing the amount of usable file space needed on the file server for communication. In step S57, if it is determined that variable j does not equal 999, a determination is made in step S59 as to whether button 12 has been pushed. If button 12 has not been pushed, the program returns to step S53 to convert and record the next one second interval of sound data. If it is determined in step S59 that button 12 has been pushed this indicates to the workstation that the user desires to enter the listen mode. In that case, the semaphore is released in step S60 and the program returns to the listen mode.

Figure 5:
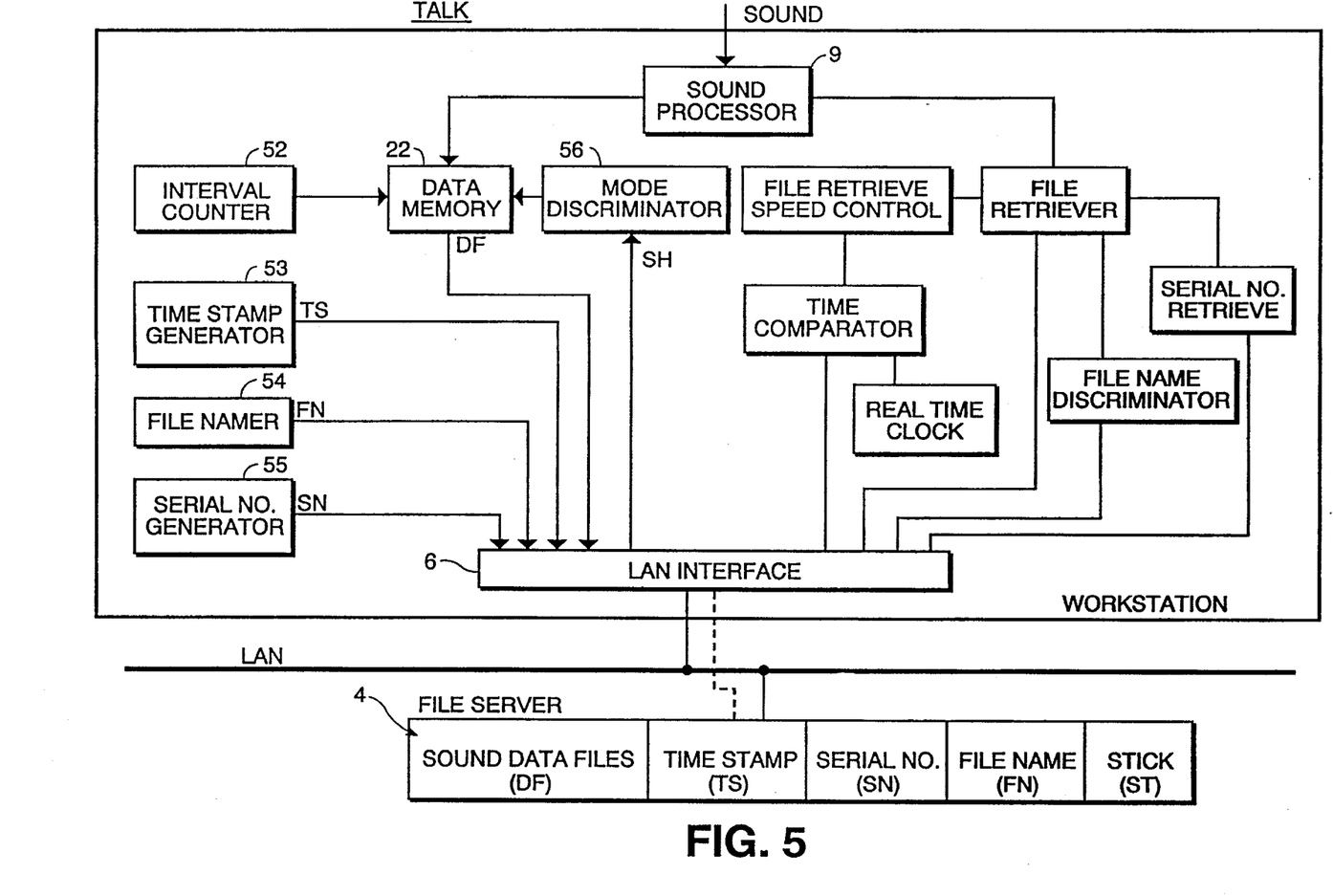
FIG. 5 is a block diagram of a workstation operating in a talk mode.

The general procedural architecture of a workstation operating in the talk mode is depicted in FIG. 5. As described above, in the talk mode the workstation converts sound such as speech received from sound processor 9 into digital sound data which are then stored in data memory 22. Initially, however, mode discriminator 56 determines whether the workstation can operate in the talk mode, by attempting to grab semaphore (ST) from file server 4. If the semaphore is grabbed, mode discriminator 56 determines that the LAN is available for talking. Other workstations are now prevented from talking since only one workstation at a time can have the semaphore. The audio input to sound processor 9 is processed, digitized and then stored as digital sound data in data memory 22. Interval counter 52 counts off one second time intervals and enables the digital sound data to be recorded in data memory 22 so that each sound data file represents one second worth of sound data. The sound data files are then sent over the LAN to be stored in file server 4 as a sound file. The identifying data or information which is transferred along with the sound data files as mentioned above, comprise a time stamp (TS), a file name (FN) and a serial number (SN). Time stamp generator 53 generates a real-time time stamp indicating the time at which the data is being transferred to file server 4. File namer 54 creates a predetermined file name used to distinguish the sound files from other files stored in the file server. Serial number generator 55 serializes the sound files by generating consecutive serial numbers used for identifying the relative position of each sound file with respect to the other sound files stored on the file server. After each sound file is transferred and stored in the file server along with the corresponding serial number, serial number generator 55 increments the serial number by one to be stored with the next sound file. As noted above, the file space in file server 4 set aside for voice communication ranges from 0–999. Accordingly, 1000 files can be stored. The serial numbers therefore run from 0 to 999. Of course, the file space allotted for voice communication can be set to any desired size. The time stamp, file name and serial number are transferred with each sound file and stored in a corresponding file space in the corresponding file in file server 4 along with the sound data file.

Figure 6:
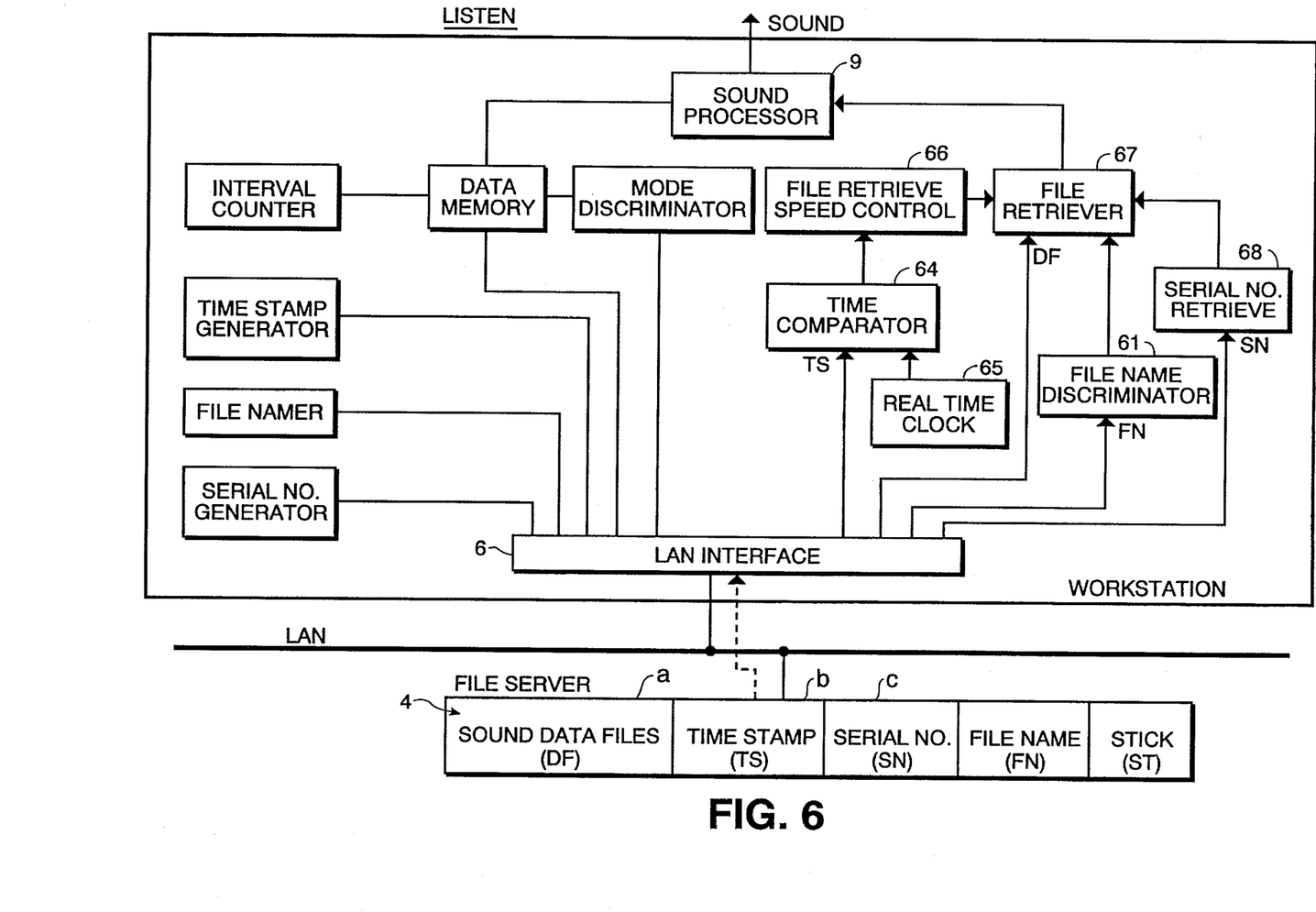
FIG. 6 is a block diagram of a workstation operating in a listen mode.

Workstation 2, which is shown as operating in the listen mode in FIG. 1, constantly monitors the LAN for the appearance of sound files having the predetermined file name to determine if there are any sound files to be listened to. The general procedural architecture of a workstation operating in the listen mode is depicted in FIG. 6. In the listen mode, file name discriminator 61 monitors the file server for files having a predetermined file name FN. When a sound file having the predetermined file name is present, the serial number corresponding to the sound data file having the predetermined file name is retrieved from the file server with the corresponding sound data file by serial number retrieve 68 so that the sound data files can be retrieved from the file server in the consecutive order in which they were filed. The corresponding sound data file is retrieved and listened to. If the next consecutive serial number is present, the sound data file corresponding to that serial number is then retrieved and listened to. If the next consecutive serial number is not present, no file is retrieved and the workstation waits for the next sound data file having the predetermined file name. Time comparator 64 retrieves the time stamp (TS) corresponding to the retrieved sound file. The time stamp (TS) is compared by comparator 44 with the real time generated by real time clock 65. The difference between the two times represents a lag time which is displayed to the user on display 11. From this lag time, a user can know how long ago the sound file was stored. The listener then has the option of controlling the file retrieve speed using speed control 66 to fast forward through the sound files to move to the most current sound file, or listen to the files at a normal listening speed. These capabilities are especially useful to late-joiners to the conversation group. The sound data files retrieved by file retriever 67 are transferred to sound processor 9 which converts the digital data in the files into an analog audio signal to be listened to by the user. The files are retrieved and listened to until all of the files for the current conversation have been listened to.

Figure 7:
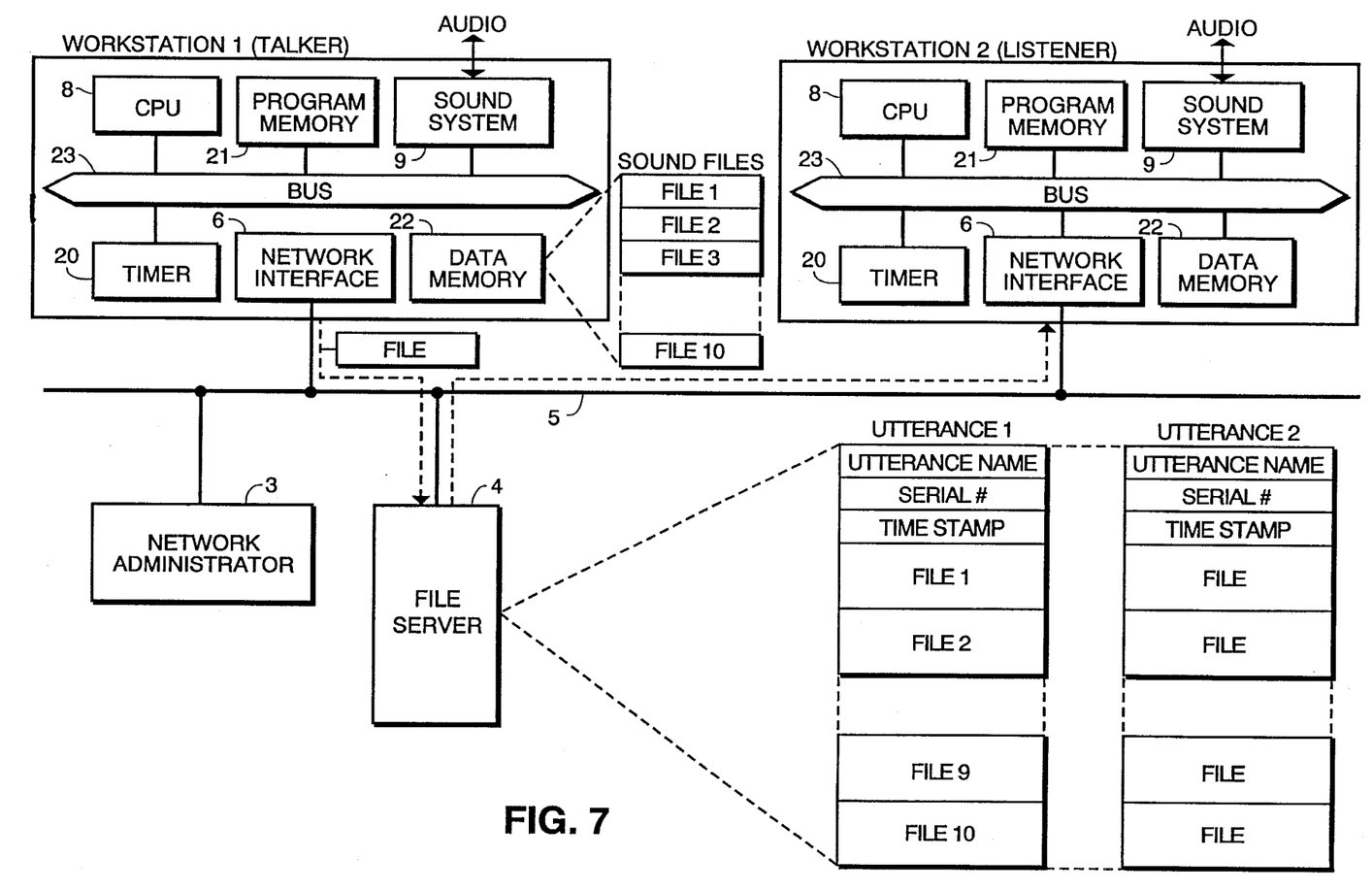
FIG. 7 is a block diagram of a LAN according to a second embodiment of the present invention.
Figure 8:
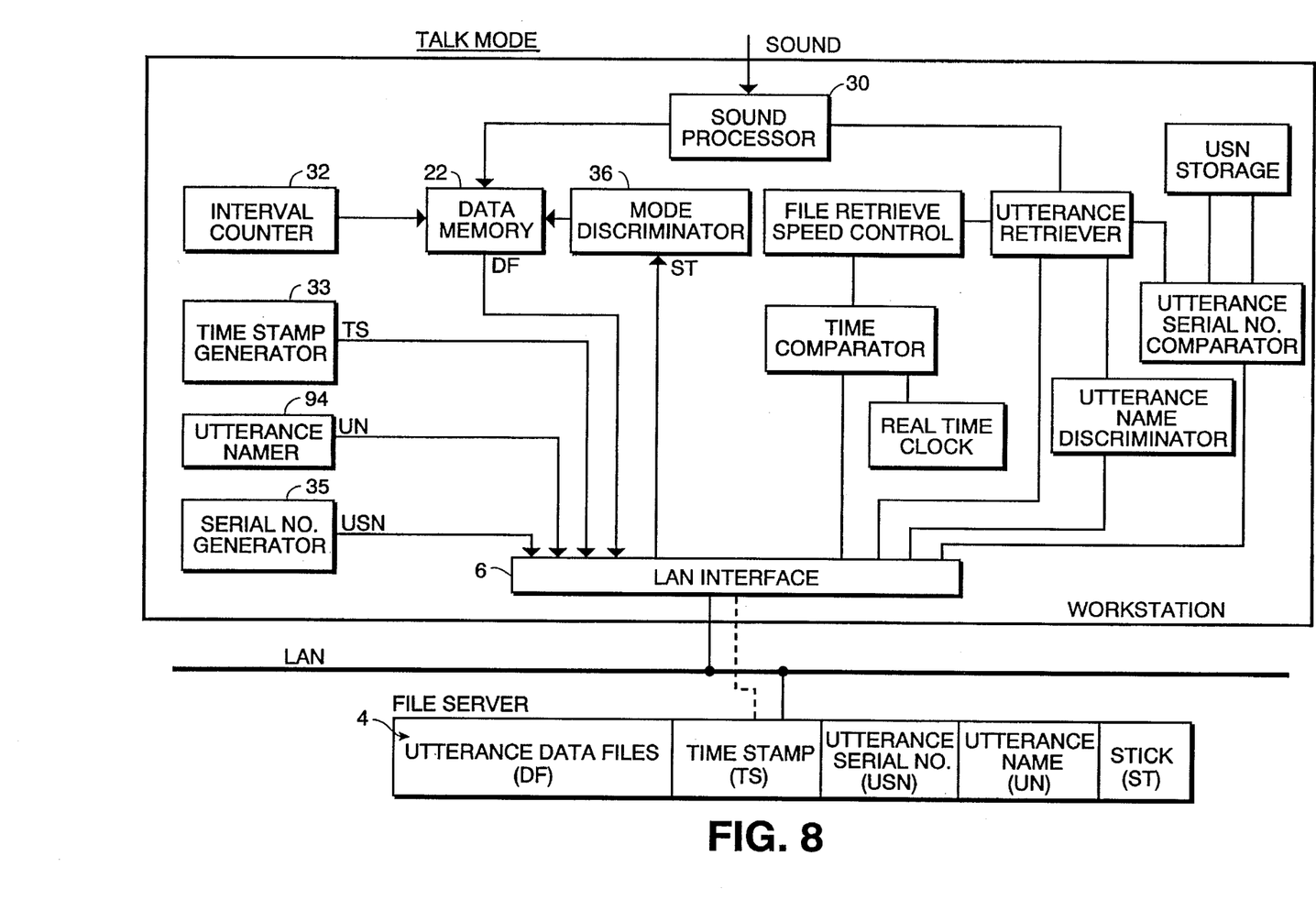
FIG. 8 is a block diagram of a workstation according to the second embodiment operating in the talk mode.
Figure 9:
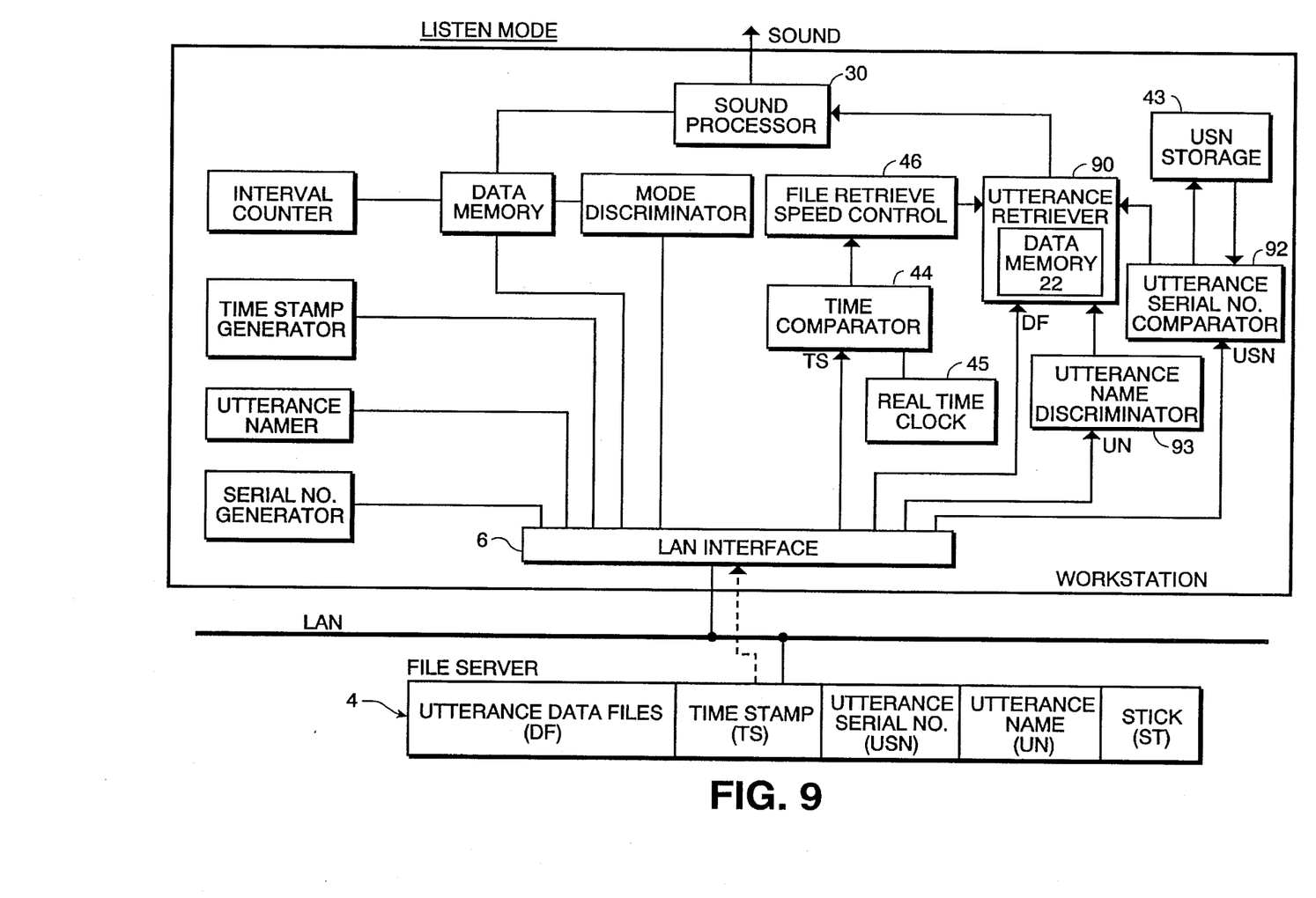
FIG. 9 is a block diagram of a workstation according to the second embodiment operating in the listen mode.

FIGS. 7 to 9 depict another embodiment of the present invention. Elements having the same function as those described above in relation to the first embodiment are represented by the same element numbers and are not discussed in detail below.

According to this embodiment of the present invention, consecutive sound files transferred to the file server 4 can be grouped in the file server into utterances as shown in FIG. 7. In this embodiment each utterance consists of a grouping of ten sound files and each sound file consists of one second worth of data. Accordingly, each utterance represents a ten second block of sound. Each utterance can be treated the same as the sound data files as discussed in the above-described embodiment, in the sense that each utterance can be time stamped, serialized, named and written into file server 4. In this embodiment, each utterance includes a time stamp indicating the time the last file in the grouping of files in the utterance was stored in data memory 22. Of course, the time could instead indicate the time the first file (or any one of the files for that matter) in the grouping of files in the utterance was stored.

As shown in FIG. 8, each utterance is stored in file server 4 with an utterance serial number (USN) using serial number generator 35 which serializes each grouping of 10 sound data files. Each utterance is stored in file server 4 with an utterance name (UN) generated by utterance namer 84. The utterance name allows a listening workstation to know that there are sound data files on the file server to be listened to. As shown in FIG. 9, an utterance is retrieved by utterance retriever 90. Time comparator 44 retrieves the time stamp TS corresponding to the utterance from file server 4 and compares it with the real time. The speed of utterance retrieval can then be controlled based on the lag time. During the listen mode, the utterance serial number USN is retrieved by utterance serial number comparator 92, and compared with the serial number of the utterance that was just previously listened to. If the retrieved serial number is greater than the previously listened to utterance serial number, it is determined that all utterances have been listened to. If the retrieved serial number is less than the serial number of the previously listened to utterance, it is determined that there are utterances to be listened to and utterance retriever 90 retrieves the utterances from the file server. During retrieval of the utterances, the ten sound data files forming the utterance are read from file server 4 and stored in data memory 22. Each consecutive sound data file is then read and converted to sound by sound processor 30. According to the present embodiment, the sound files can be managed in groups of 2 or more.

It will be appreciated that the one second sound data files could be selected to be any time interval and that the number of sound data files forming an utterance can be selected to be more or less than the 10 as described above.

While the present invention has been described with respect to what is considered to be the preferred embodiments, it is to be understood that the present invention is not limited to the disclosed embodiments. To the contrary, the present invention is intended to cover various modifications and equivalent arrangements included within the spirit and scope of the appended claims.

What is claimed is:

1. A network sound channel comprising:

a local area network (LAN) having a plurality of connection nodes for connecting computer devices and including storage means for storing digital information transmitted over said LAN; and plural computer devices connected via respective connection nodes to said LAN, each computer device including a sound processor for converting sound into digital information and digital information into sound, each computer device being operable in (a) a talk mode in which the computer device attempts to grab a network semaphore from the storage means and in which, only if the device grabs the semaphore, the sound processor converts sound into digital information and the digital information is stored in said storage means over said LAN in serialized files having a predetermined naming convention, and (b) a listen mode in which, if certain serialized files having a predetermined naming convention are in said storage means, said certain serialized files are retrieved from said storage means over said LAN, transferred to a local memory and converted by the sound processor into sound in accordance with their serialization.

2. A network sound channel according to claim 1, wherein said storage means comprises a file server.

3. A network sound channel according to claim 2, wherein said file server includes a predetermined amount of file space reserved based on a number of computer devices connected to said LAN.

4. A network sound channel according to claim 3, wherein the predetermined amount of file space includes a beginning and an end and the digital information is written circularly into the file space from the beginning through to the end and then from the beginning again.

5. A network sound channel according to claim 1, wherein when operating in the talk mode, sound is divided into utterances for conversion into digital information, files having a predetermined length are created using the digital information, and the files are transferred over said LAN to be stored in said storage means.

6. A network sound channel according to claim 5, wherein the files are transferred at predetermined time intervals over said LAN to be stored by said storage means.

7. A network sound channel according to claim 5, wherein the files are stored in said storage means together with an utterance serial number, a file name and a time tag indicating a present real time.

8. A network sound channel according to claim 7, wherein in the listen mode the utterance serial number, the file name and the time tag are retrieved from said storage means over said LAN.

9. A network sound channel according to claim 8, wherein the retrieved utterance serial number is compared with a stored utterance serial number and if the retrieved utterance serial number is greater than the stored utterance serial number the corresponding files are retrieved.

10. A network sound channel according to claim 8, wherein the retrieved time tag is compared with a time generated by a real time clock and a rate at which the information is retrieved from said storage means is determined accordingly.

11. A network sound channel according to claim 1, wherein, when certain serialized files are converted into sound, the computer device displays a lag time which indicates how long ago the certain serialized files were stored in said storage means.

12. A network sound channel according to claim 11, further comprising:

a speed control for controlling a speed at which the certain serialized files are retrieved from said storage means, transferred to a local memory, and converted into sound.

13. A local area network (LAN) comprising:

file means for storing digital files;

plural computer devices connected via respective connection nodes to said LAN, each computer device including a sound processor for converting sound into digital information and digital information into sound, each computer device being operable in a first mode in which the computer device attempts to grab a network semaphore from the file means and in which, only if the device grabs the semaphore, the sound processor converts sound into digital information, and a second mode in which the sound processor converts digital information into sound, wherein when one of said computer devices is operating in the first mode, an information processor transfers the digital information converted by said sound processor over said LAN to be stored in said file means in serialized files having a predetermined naming convention and each other of said computer devices which are operating in the second mode retrieves the serialized files, transfers the serialized files to a local memory, and converts the digital information in the serialized files into sound in accordance with their serialization.

14. A local area network according to claim 13, wherein, when digital information in the serialized files is converted into sound, the computer device displays a lag time which indicates how long ago the serialized files were stored in said file means.

15. A local area network according to claim 14, further comprising:

a speed control for controlling a speed at which the serialized files are retrieved from said file means, transferred to a local memory, and converted into sound.

16. Programmed computer equipment for communicating over a local area network using a file server, said computer equipment comprising:

a sound processor for converting sound into digital information and digital information into sound;

a memory for storing programs used for performing computer implemented steps and for storing sound files; and a computer processor for performing the computer implemented steps using the stored programs, the computer implemented steps comprising steps for operating the computer equipment in (a) a talk mode in which the computer equipment attempts to grab a network semaphore from the file server and in which, only if the device grabs the semaphore, the sound processor converts sound into digital information and the digital information is stored in the file server in serialized files having a predetermined naming convention, and (b) a listen mode in which, if certain serialized files having a predetermined naming convention are in the file server, said certain serialized files are retrieved from the file server over the LAN, transferred to a local memory and converted by the sound processor into sound in accordance with their serialization.

17. Programmed computer equipment according to claim 16, wherein, when certain serialized files are converted into sound, the computer equipment displays a lag time which indicates how long the certain serialized files have been in the file server.

18. Programmed computer equipment according to claim 17, further comprising:

a speed control for controlling a speed at which the certain serialized files are retrieved from the file server, transferred to a local memory, and converted into sound.

19. Programmed computer equipment connected to a local area network (LAN) including a file server for performing voice communication between a plurality of programmed computer equipment, each said programmed computer equipment comprising:

a sound processor for converting sound into digital information and digital information into sound;

a memory for storing computer code used for performing computer implemented steps using the stored computer code, the computer implemented steps comprising steps for operating said processor in a talk mode and in a listen mode, wherein the computer code includes code for a talk mode to (1) determine by reference to whether a semaphore can be grabbed if another computer equipment is storing sound files in the file server, (2) convert sound into digital data using the sound processor if no other computer equipment is storing sound files in the file server, (3) create files using the digital data, and (4) transmit the files over the LAN to the file server; and includes code for a listen mode to (5) search sound files stored on the file server for a sound file named in accordance with a predetermined naming convention, (6) retrieve files from the file server if it is determined that a file named in accordance with a predetermined naming convention exists to be listened to, and (7) convert the retrieved files into sound using the sound processor.

20. Programmed computer equipment according to claim 19, wherein the computer code includes code to display a lag time which indicates how long the retrieved files have been in the file server.

21. Programmed computer equipment according to claim 20, further comprising:

a speed control for controlling a speed at which the files are retrieved from the file server and converted into sound.

* * * * *